US008384026B2

(12) United States Patent
O'Malley et al.

(10) Patent No.: US 8,384,026 B2
(45) Date of Patent: Feb. 26, 2013

(54) ATMOSPHERIC PRESSURE SOLIDS ANALYSIS PROBE ASSEMBLY

(75) Inventors: Ronan O'Malley, Manchester (GB); Hilary Jamieson Major, Cheshire (GB); Matthew James Henderson, Lancashire (GB); Richard William Jarrold, Cheshire (GB); Richard Barrington Moulds, Cheshire (GB)

(73) Assignee: Micromass UK Limited, Manchester (GB)

( * ) Notice: Subject to any disclaimer, the term of this patent is extended or adjusted under 35 U.S.C. 154(b) by 87 days.

(21) Appl. No.: 13/013,006

(22) Filed: Jan. 25, 2011

(65) Prior Publication Data

US 2011/0180706 A1 Jul. 28, 2011

Related U.S. Application Data

(60) Provisional application No. 61/298,266, filed on Jan. 26, 2010, provisional application No. 61/354,762, filed on Jun. 15, 2010.

(51) Int. Cl.
*H01J 49/04* (2006.01)
*G01N 35/10* (2006.01)

(52) U.S. Cl. ...................... 250/289; 250/288; 73/864.21

(58) Field of Classification Search .................. 250/281, 250/288, 289; 73/863, 863.81, 863.85–863.86, 73/864.21, 864.82, 23.41
See application file for complete search history.

(56) References Cited

U.S. PATENT DOCUMENTS 5,970,804 A 10/1999 Robbat, Jr.
6,337,480 B1 * 1/2002 Andrien et al. ............... 250/288
6,858,437 B2 * 2/2005 Andrien et al. ............... 436/173
2002/0194938 A1 * 12/2002 Koo et al. .................. 73/864.91
2005/0023455 A1 * 2/2005 Bailey et al. .................. 250/288
2012/0126108 A1 * 5/2012 Newton ........................ 250/282

OTHER PUBLICATIONS

McEwen, Charles et al; Analysis of Solids, Liquids, and Biological Tissues Using Solids Probe Introduction at Atmospheric Pressure on Commercial LC/MS Instruments; Anal. Chem. 2005, 77, 7826-7831.
Huey, L. Gregory, Measurement Of Trace Atmospheric Species By Chemical Ionization Mass Spectrometry: Speciation of Reactive Nitrogen and Future Directions; Mass Spectrometry Reviews, 2007, 26, 166-184.
Balogh, Michael P.; Alternatives in the Face of Chemical Diversity; LCGC: Apr. 1, 2007; http://license.icopyright.net/user/viewFreeUse.act?fuid=ODQ3NDIx.
Voisin, D.; Thermal Desorption Chemical Ionization Mass Spectrometer For Real Time Chemical Characterization Of Fine Aerosol; Geophysical Research Abstracts, vol. 5, 06599, 2003.
Popov, Igor A.; Detection of explosives on solid surfaces by thermal desorption and ambient ion/molecule reactions; Chem. Commun., 2005, 1953-1955.
McEwen, Charles, et al; Analysis of the Inhibition of the Ergosterol Pathway in Fungi Using the Atmospheric Solids Analysis Probe (ASAP) Method; 2007 American Society for Mass Spectrometry, Published online Apr. 6, 2007.

* cited by examiner

*Primary Examiner* — Robert Kim
*Assistant Examiner* — David E Smith
(74) *Attorney, Agent, or Firm* — McCarter & English, LLP

(57) ABSTRACT

An atmospheric pressure ion source probe assembly (10) includes an outer casing assembly (14) adapted for attachment to an atmospheric pressure ion source chamber of a mass spectrometer and a docking probe (12) for detachable connection to the outer casing. The arrangement is such that in its docked condition or position the probe extends through, and in sealing engagement with the outer casing. In this docked condition or position, a sample holder (28) carried by the docking probe (12) is presented within the ion chamber. When the docking probe is detached from the outer casing the casing can be sealed off relative to the ion source chamber.

21 Claims, 4 Drawing Sheets

ATMOSPHERIC PRESSURE SOLIDS ANALYSIS PROBE ASSEMBLY

RELATED APPLICATIONS

This application claims the benefit of U.S. Provisional Application Ser. No. 61/298,266, filed Jan. 26, 2010, and U.S. Provisional Application Ser. No. 61/354,762, filed Jun. 15, 2010. The entire contents of these applications are incorporated by reference herein.

FIELD OF THE INVENTION

The present invention relates to improvements in the construction and use of analysis probe assemblies for atmospheric-pressure solids analysis probe techniques used in conjunction with mass spectrometers.

BACKGROUND

Direct analysis of samples using atmospheric pressure ionization (API) provides a more rapid method for analysis of volatile and semi-volatile compounds than vacuum solids probe methods and can be accomplished on commercial API mass spectrometers. With only a simple modification to either an electrospray (ESI) or atmospheric pressure chemical ionization (APCI) source, solid as well as liquid samples can be analysed quickly. The method acts as a fast solids/liquid probe introduction as well as an alternative to relatively direct analysis in real time (available as DART® technology from JEOL, Tokyo, Japan) and desorption electrospray ionization (DESI) methods for many compound types. Vaporization of materials occurs in a hot nitrogen gas stream flowing from an ESI or APCI probe. Ionization of thermally induced vapors occurs by corona discharge under standard APCI conditions. Accurate mass and mass-selected fragmentation are achieved as is the ability to obtain ions from biological tissue, paper currency, and other objects placed in the path of the hot nitrogen stream.

The introduction of direct analysis in real time and desorption electrospray ionization (DESI) methods has led to the development of a technique known as atmospheric-pressure solids analysis probe (available as ASAP™ technology from M&M Mass Spec Consulting, Hockessin, Del.) Atmospheric-pressure solids analysis probe is a method for rapidly analyzing volatile or semi-volatile liquid or solid materials using only slightly modified commercial electrospray (ESI) or atmospheric pressure chemical ionization (APCI) ion sources. The technique is similar to the mass spectrometric methods used for the analysis of drugs and explosives at atmospheric pressure and overlaps significantly with the direct analysis in real time and DESI methods.

Atmospheric-pressure solids analysis probe can be used in conjunction with time-of-flight (TOF), Orbitrap, double-focusing magnetic sector, and Fourier transform ion cyclotron resonance mass spectrometers to obtain high mass resolution and accurate mass measurement. Fragmentation is minimal in APCI relative to electron ionization; thus, mixtures are more easily analyzed than with solids probe electron ionization. However, fragmentation can be enhanced by so-called cone-voltage fragmentation or by collision-induced fragmentation in conjunction with MS/MS of selected precursor ions. Because vaporization and ionization with atmospheric-pressure solids analysis probe occurs at atmospheric pressure, a mass spectrum can be acquired quickly from solid and liquid materials such as pure compounds, mixtures, biological tissue, and plastics. The attributes of speed of analysis, accurate mass measurement, and fragmentation of selected precursor ions is achieved as is the sensitivity of atmospheric-pressure solids analysis probe, demonstrated by detecting drugs present on paper currency.

Atmospheric-pressure solids analysis probe can be implemented on any ESI/APCI ion source by simple introduction of the material of interest into a stream of heated gas near the ionization region. The heated gas used in experiments has been obtained from either the heated nitrogen gas used for desolvation in an ESI or an APCI probe. The atmospheric-pressure solids analysis probe method uses the sources of heated gas available with ESI/APCI ion sources for volatilization; otherwise it is similar to the techniques for analysis of drugs removed from paper currency and for analysis of explosives wiped from solid surfaces. The material used to introduce samples into the hot gas stream needs to be free of volatile components. Melting point tubes are inexpensive and ideal for this application. Ionization is by a corona discharge at atmospheric pressure using the standard voltages and discharge apparatus supplied with the APCI ion source (alternatively, ionization can be by photoionization). When introducing samples into the ionization region, it is preferred that the ion source be enclosed and vented to a hood to prevent vapors from reaching the laboratory air.

A known atmospheric pressure solids analysis probe comprises a one-piece probe capable of holding a disposable or easily cleaned sample holding device which can be partially inserted into an atmospheric pressure ionization source comprising an enclosure or chamber, thus allowing the sample on the holding device to be inserted into the atmospheric pressure ionization region of a mass spectrometer.

SUMMARY

Some embodiments relate to improved atmospheric pressure solids analysis probes. One embodiment provides an atmospheric pressure ion source probe assembly, for a mass spectrometer, that includes an outer casing adapted for attachment to an atmospheric pressure ion source chamber of a mass spectrometer and a docking probe for detachable connection to the outer casing the arrangement being such that in its docked condition or position the probe extends through, and in sealing engagement with, the outer casing so that a sample holder carried by the probe is presented within the ion source chamber and such that when the probe is detached from the outer casing the casing can be sealed off relative to the ion source chamber.

One alternative embodiment provides an atmospheric pressure ion source probe assembly for a mass spectrometer; the assembly includes an outer casing adapted for attachment to an atmospheric pressure ion source chamber of a mass spectrometer and a docking probe removably receivable by the outer casing such that the probe extends, in use, through the outer casing and in sealing engagement therewith so that a sample holder carried by the probe is presented within the ion source chamber, wherein the outer casing includes a closure for sealing off the casing when the probe is removed therefrom.

According to a feature, means may be provided by the outer casing to lock the probe in its or in a docked condition or position and/or to seal off the outer casing relative to the ion source chamber. For example, the closure may be configured to releasably lock the probe, for example to the outer casing, e.g. in its docked condition or position. In constructions where a locking and sealing means is provided, the locking and sealing means, for example the closure, may be movable between a closed condition or position, e.g. in which it seals off the casing when the probe is detached, to an open condition or position, e.g. in which it cooperates with the probe to lock the probe in its docked condition or position. The locking and sealing means or closure may comprise a pivotal lever carried by the casing, the lever being pivotal from the closed condition or position to the open condition or position. Preferably, the pivotal lever is provided with a resilient seal which closes off a bore provided in the casing for receiving the docking probe.

According to another feature, the outer casing may have a main housing adapted for attachment to an atmospheric pressure ion source chamber and/or an external tube extending from the main housing to extend into the ion source chamber when the casing is attached thereto, and/or an internal tube. The external and internal tubes of the housing may be coaxial and/or sized to receive the docking probe so that, when docked, the probe extends through the internal and external tubes and the sample holder of the probe extends beyond the extremity of the external tube. Preferably, the docking probe includes a hollow enlargement which connects onto the internal tube of the housing when the probe is in its docked condition or position. In constructions where the docking probe includes a hollow enlargement, the hollow enlargement and the internal tube may have mating portions provided by complementary frusto-conical faces.

According to a further feature, the sample holder may include a quick release clamp for securing a sample rod in the sample holder.

According to a still further feature, the docking probe may be axially adjustable with respect to the outer casing when disposed in its docked condition or position.

According to yet another feature, the assembly may include recognition means to determine the presence or absence of the docking probe when the assembly is in use.

BRIEF DESCRIPTION OF THE DRAWINGS

An embodiment of an atmospheric pressure solids analysis probe assembly according to the invention will now be described, by way of example, with reference to the accompanying drawings in which.

DETAILED DESCRIPTION

Figure 1:
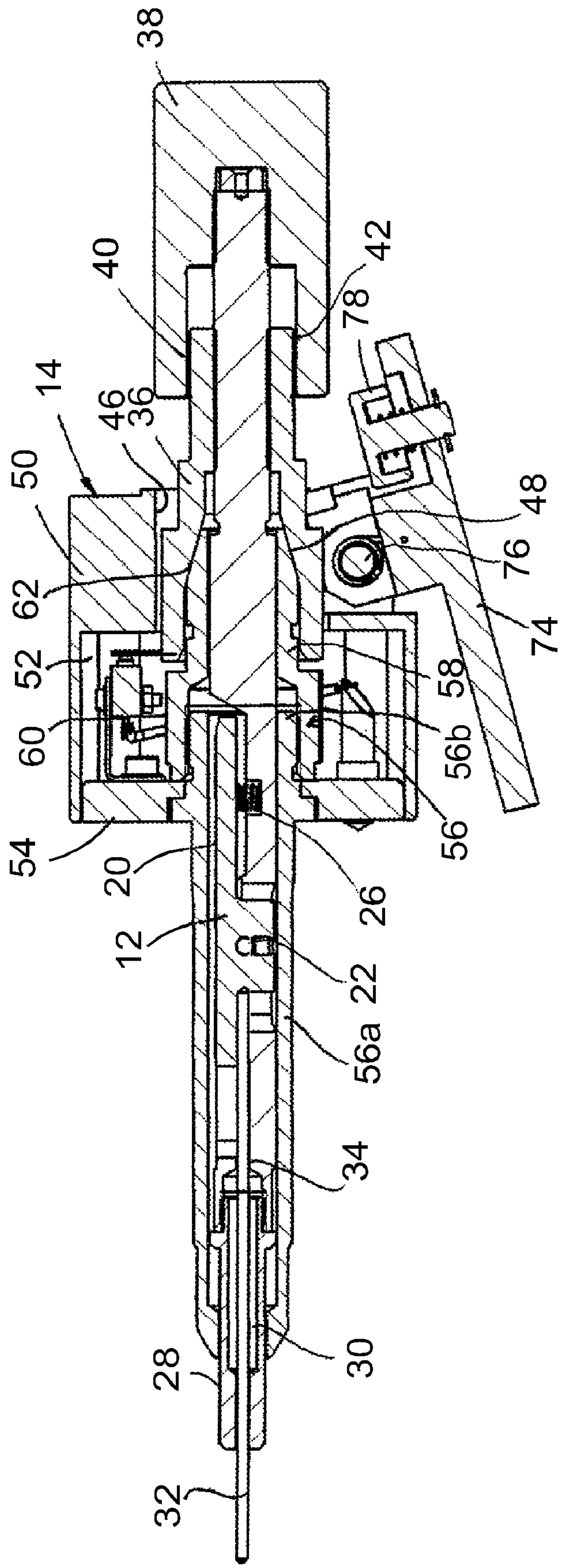
FIG. 1 is a cross-section through a probe assembly according to the invention shown with the docking probe received in the outer casing assembly.
Figure 2:
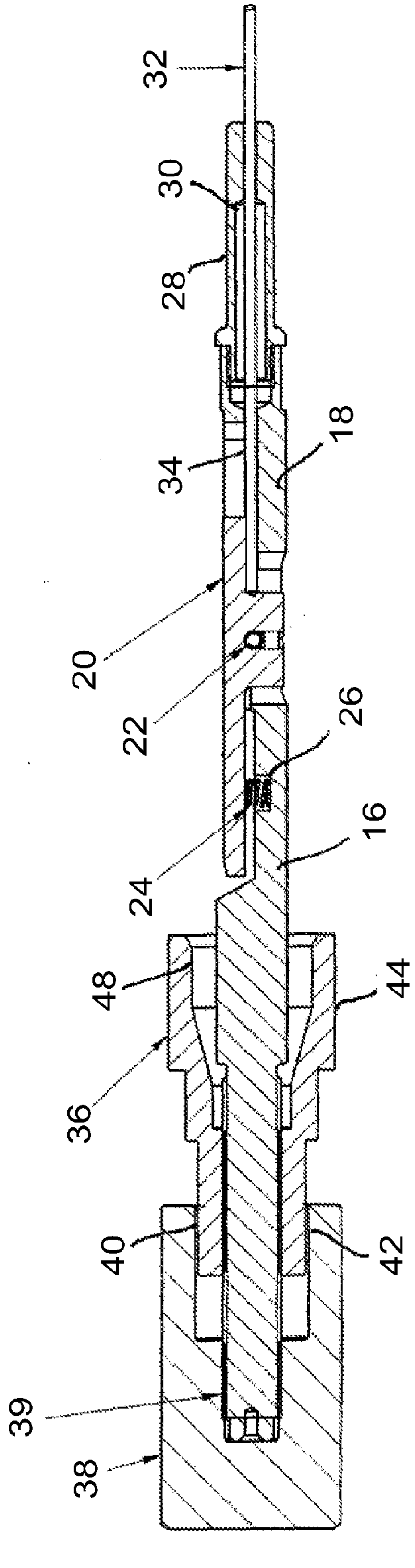
FIG. 2 is a cross-section through the docking probe.
Figure 3:
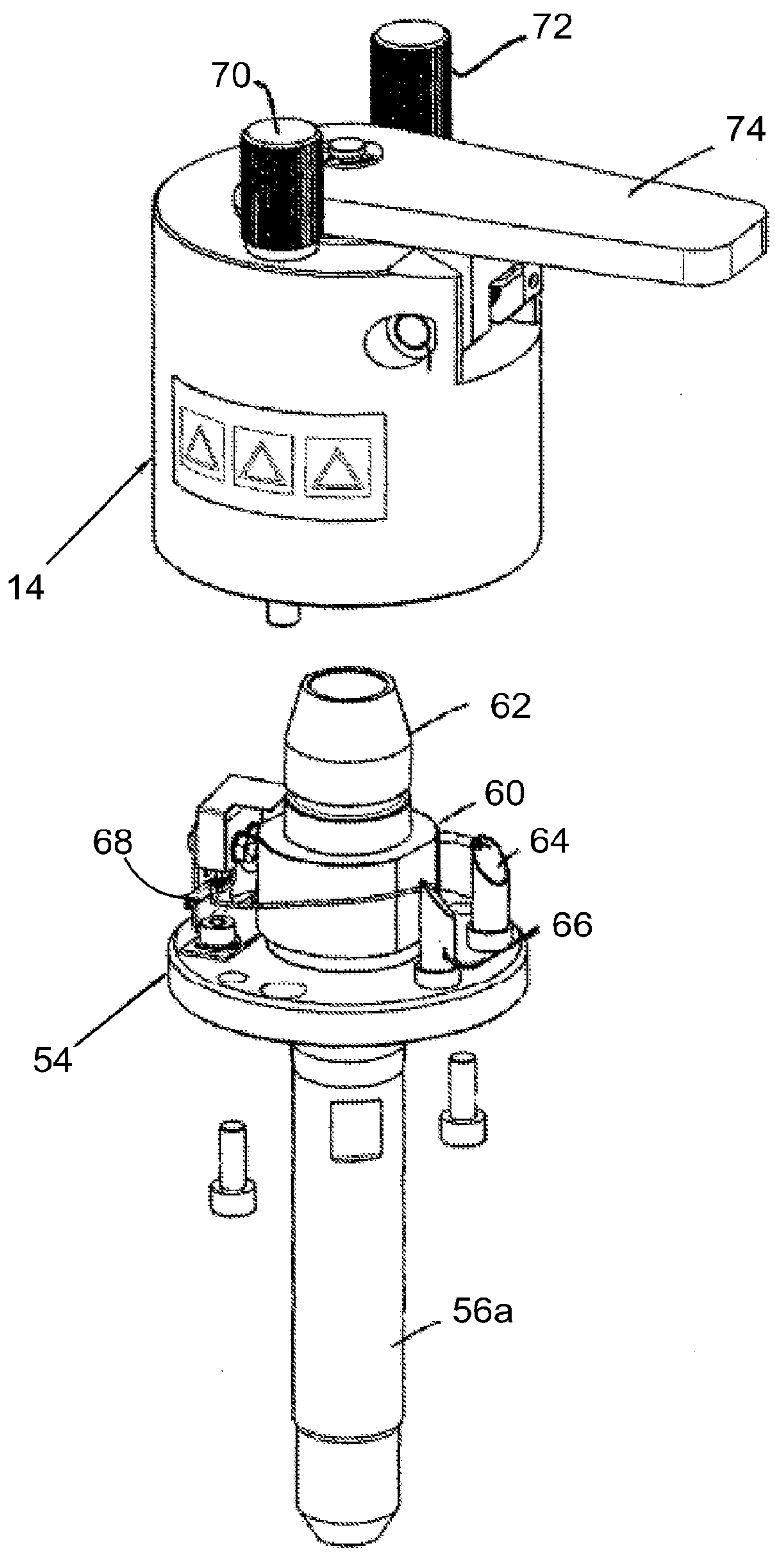
FIG. 3 is an exploded perspective view of the outer casing assembly.
Figure 4:
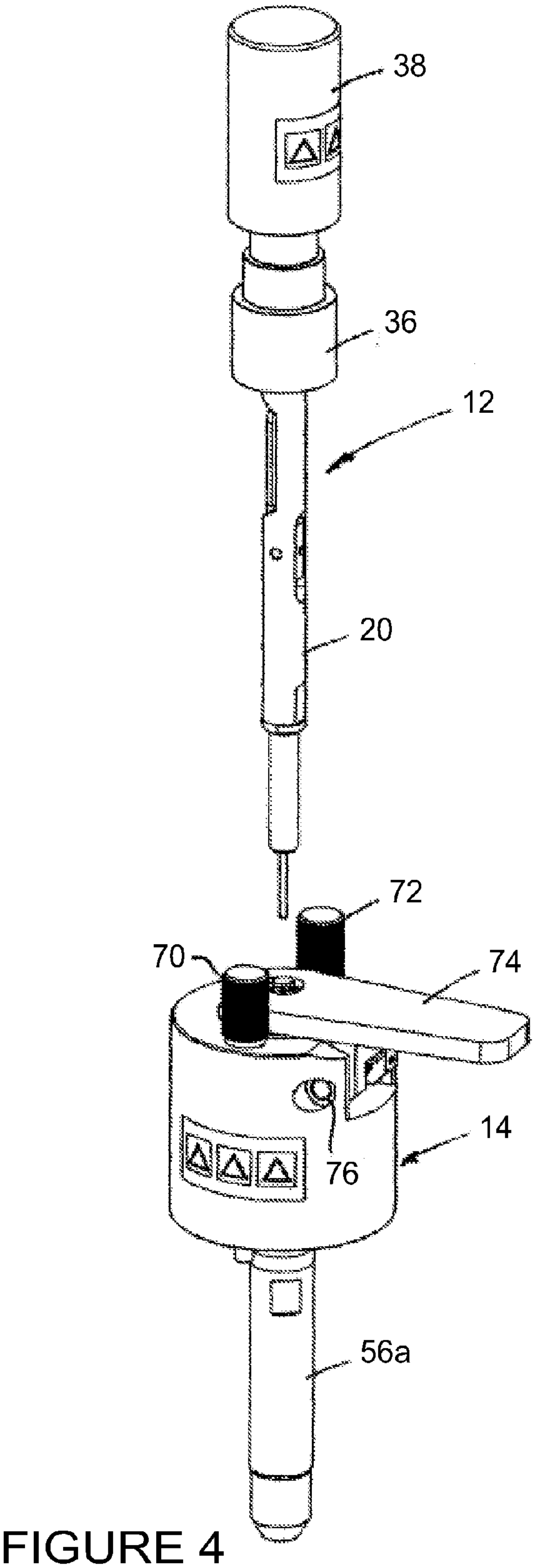
FIG. 4 is a perspective view of the probe assembly with the probe extracted from the outer casing assembly.
Figure 5:
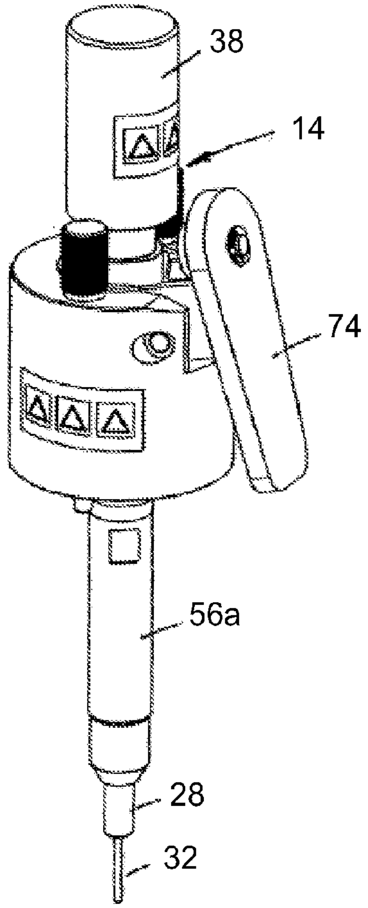
FIG. 5 is a perspective view similar to FIG. 4 but with the docking probe received in the outer casing assembly.

The modular probe assembly 10 comprises two main components; a removable docking probe 12 and an outer casing assembly 14. The removable docking probe 12 comprises a main elongate body section 16 which carries at one of its ends a sample holding assembly 18. The sample holding assembly includes a clip lever 20 which is pivotally mounted on the body section 16 by means of a dowel connection 22 and is rotatable about the axis of the dowel connection against the bias of a compression spring 24 located in a recess 26 between the body section and one end of the clip lever. A removable nose section 28 of the sample holding assembly is pivotal together with the clip lever relative to the body section. The removable nose section has an axial through bore 30 and receives a disposable sample holding rod 32, usually a glass rod, which extends through the nose section 28 and is held in a central bore 34 of the rod holder by downward pressure exerted by the free end of the clip lever. The sample holding rod can be released, removed and exchanged when the clip lever assembly is pivoted out of axial alignment with the main body section against the bias of the compression spring 24.

The opposite end of the main body portion of the docking probe carries an adjuster nut 36 which provides a connecting interface between the docking probe 12 and the outer casing assembly 14. A rotatable adjuster 38 is mounted at the end 39 of the docking probe remote from the rod holder. Rotation of the adjuster relative to the adjuster nut causes axial movement of the main elongate body section 16 relative to the outer assembly as described below.

The adjuster nut 36 includes an externally screw threaded end section 40 which mates with a complementary screw-threaded portion 42 of the adjuster 32. At its opposite end the adjuster nut has a cylindrical end portion 44 which is slidably received in an internal cylindrical bore 46 formed in the outer assembly 14. Internally of the cylindrical end portion 44, the adjuster includes a frusto-conical bore 48 which receives a complementary connector of the outer assembly.

The outer assembly comprises a housing 50 which includes an internal chamber 52 which is closed at one end by an end plate assembly 54 and is open at its opposite end by the cylindrical bore 46. The end plate assembly carries a hollow axial fitment tube 56 which is adapted to receive the docking probe. An external length 56*a* of the axial fitment tube extends away from the housing chamber and is connected to the end plate 54 of the assembly. The external length of the fitment tube receives the rod holder assembly of the docking probe. An internal portion 56*b* of the fitment tube, which is integral and coaxial with the external length, extends into the chamber 52. The end plate 54, the external length 56*a* and internal portion 56*b* of the fitment tube are fixed relative to the housing 50. The fitment tube also includes an axial component which comprises a hollow axial section 58 disposed within the chamber 52.

Axial section 58 includes a cylindrical portion 60 which is fitted onto the internal portion 56*b* of the fitment tube and includes a frusto-conical portion 62 which is a complementary fit in the frusto-conical bore 48 of the adjuster nut when the docking probe is received in the outer assembly. Internally the end plate 54 carries probe recognition fittings 64, 66 which are incorporated in a resistor circuit 68 which will indicate when the docking probe is present in the outer assembly.

In use the modular probe assembly of the present invention is connected to an atmospheric pressure ion source chamber of a mass spectrometer. The arrangement is such that a pair of hold down screws 70, 72 extend through the outer assembly 14 and connect to the ion source chamber wall so that the end plate 54 is bolted down onto the chamber wall and the external fitment tube 56*a* extends into the ion source chamber. The outer assembly 14 can remain connected to the ion source chamber regardless of whether or not it carries a sample docking probe. When no docking probe is present, it is necessary to create a seal between the ion source chamber and the outer assembly. This is achieved by means of a locking lever 74 which seals off the internal chamber 52 of the housing 50. The locking lever 74 is pivotally mounted on the housing 50 by means of a pivotal connection 76 and carries at one of its ends a spring loaded sealing plug 78. When the locking lever is brought into its closed position the sealing plug 76 sealingly engages the open mouth of the frusto-conical portion 62 of the internal axial portion 58 of the fitment tube.

In order to removably connect a sample docking probe to the assembly the locking lever is pivoted to an open position in which the mouth of the frusto-conical portion 62 is opened but the outer assembly remains secured to the housing of the ion source chamber.

The assembly is now able to receive a sample docking probe 12 which is inserted into the outer assembly 14 so that the sample holding assembly 18 extends through the axial fitment tube 56. Thus, the free axial end of the rod holder extends from the free end of the fitment tube to expose the sample rod 32 within the ion chamber.

The docking probe 12 is axially adjustable relative to the outer assembly 14 in order to vary the location of the sample rod within the ion source chamber. In order to cause such adjustment, the adjuster 38 nut is rotated about the adjuster nut 36 which causes axial movement between the main elongate body section 16 and the fitment tube and thus the docking probe moves axially within the fitment tube to provide adjustment in either axial direction.

It will be appreciated by those skilled in the art that any number of combinations of the aforementioned features and/or those shown in the appended drawings provide clear advantages over the prior art and are therefore within the scope of the invention described herein.

The invention claimed is:

1. An atmospheric pressure ion source probe assembly for a mass spectrometer, the probe assembly comprising an outer casing adapted for attachment to an atmospheric pressure ion source chamber of a mass spectrometer and a docking probe for detachable connection to the outer casing, the arrangement being such that in its docked condition or position the probe extends through, and in sealing engagement with, the outer casing so that a sample holder carried by the probe is presented within the ion chamber and such that when the probe is detached from the outer casing the casing can be sealed off relative to the ion source chamber, the outer casing including a pivotal lever, the lever being pivotal from a closed position in which it seals off the casing relative to the ion source chamber when the probe is detached, to an open position in which it cooperates with the probe to lock the probe in its docked condition or position.

2. A probe assembly as claimed in claim 1, wherein the pivotal lever is provided with a resilient seal which closes off a bore provided in the casing for receiving the docking probe.

3. A probe assembly as claimed in claim 1, wherein the outer casing has a main housing adapted for attachment to an ion source chamber, an external tube extending from the main housing to extend into the ion source chamber when the casing is attached thereto, and an internal tube, the external and internal tubes of the housing being coaxial and sized to receive the docking probe so that, when docked, the probe extends through the internal and external tubes and a sample holder of the probe extends beyond the extremity of the external tube.

4. A probe assembly as claimed in claim 3, wherein the docking probe includes a hollow enlargement which connects onto the internal tube of the housing when the probe is in its docked condition or position.

5. A probe assembly as claimed in claim 4, wherein the hollow enlargement and the internal tube have mating portions provided by complementary frusto-conical faces.

6. A probe assembly as claimed in claim 1, wherein the sample holder includes a quick release clamp for securing a sample rod in the sample holder.

7. A probe assembly as claimed in claim 1, wherein the docking probe is axially adjustable with respect to the outer casing when disposed in its docked condition or position.

8. A probe assembly as claimed in claim 1, wherein the assembly includes recognition means to determine the presence or absence of the docking probe when the assembly is in use.

9. An atmospheric pressure ion source probe assembly for a mass spectrometer, the assembly comprising an outer casing adapted for attachment to an atmospheric pressure ion source chamber of a mass spectrometer and a docking probe removably receivable by the outer casing such that the probe extends, in use, through the outer casing and in sealing engagement therewith so that a sample holder carried by the probe is presented within the ion source chamber, wherein the outer casing includes a closure for sealing off the casing when the probe is removed therefrom and for locking the probe, when in use, in a docked condition or position, the closure comprising a pivotal lever carried by the casing, the lever being pivotal from a closed position in which it seals of the casing when the probe is detached, to an open position in which it cooperates with the probe to lock the probe in its docked condition or position.

10. A probe assembly as claimed in claim 9, wherein the pivotal lever is provided with a resilient seal which closes off a bore provided in the casing for receiving the docking probe.

11. A probe assembly as claimed in claim 9, wherein the outer casing has a main housing adapted for attachment to an ion source chamber, an external tube extending from the main housing to extend into the ion source chamber when the casing is attached thereto, and an internal tube, the external and internal tubes of the housing being coaxial and sized to receive the docking probe so that, when docked, the probe extends through the internal and external tubes and a sample holder of the probe extends beyond the extremity of the external tube.

12. A probe assembly as claimed in claim 11, wherein the docking probe includes a hollow enlargement which connects onto the internal tube of the housing when the probe is in its docked condition or position.

13. A probe assembly as claimed in claim 12, wherein the hollow enlargement and the internal tube have mating portions provided by complementary frusto-conical faces.

14. A probe assembly as claimed in claim 9, wherein the sample holder includes a quick release clamp for securing a sample rod in the sample holder.

15. A probe assembly as claimed in claim 9, wherein the docking probe is axially adjustable with respect to the outer casing when it is received thereby.

16. A probe assembly as claimed in claim 9, wherein the assembly includes recognition means to determine the presence or absence of the docking probe when the assembly is in use.

17. An ion source chamber for an analytical apparatus comprising a probe assembly according to claim 1.

18. An analytical apparatus comprising a probe assembly according to claim 1.

19. A mass spectrometer comprising a probe according to claim 1.

20. A probe assembly as claimed in claim 8, wherein the recognition means comprises a resistor circuit including recognition fittings, which indicate when the docking probe is present in the outer casing.

21. A probe assembly as claimed in claim 16, wherein the recognition means comprises a resistor circuit including recognition fittings, which indicate when the docking probe is present in the outer casing.

* * * * *